(12) United States Patent
Worthington et al.

(10) Patent No.: US 7,783,811 B2
(45) Date of Patent: Aug. 24, 2010

(54) EFFICIENT INTERRUPT MESSAGE DEFINITION

(75) Inventors: Bruce Worthington, Redmond, WA (US); Vinod Mamtani, Bellevue, WA (US); Brian Railing, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 154 days.

(21) Appl. No.: 12/002,442

(22) Filed: Dec. 17, 2007

(65) Prior Publication Data

US 2009/0157935 A1 Jun. 18, 2009

(51) Int. Cl.
*G06F 13/24* (2006.01)
*G06F 13/32* (2006.01)

(52) U.S. Cl. .................. 710/268; 710/266; 710/269; 718/105

(58) Field of Classification Search .............. 710/264
See application file for complete search history.

(56) References Cited

U.S. PATENT DOCUMENTS

| 6,253,275 | B1 | 6/2001 | Waldron et al. |
| 6,738,847 | B1* | 5/2004 | Beale et al. ............ 710/260 |
| 6,772,241 | B1 | 8/2004 | George et al. |
| 6,983,339 | B1 | 1/2006 | Rabe et al. |
| 7,117,285 | B2 | 10/2006 | Ota |
| 7,197,588 | B2 | 3/2007 | Tsao et al. |
| 7,257,658 | B2 | 8/2007 | Winkler et al. |
| 7,328,294 | B2* | 2/2008 | Kim et al. ............ 710/260 |
| 7,529,875 | B2* | 5/2009 | Karamatas et al. ......... 710/260 |
| 2005/0060460 | A1* | 3/2005 | Karamatas et al. ......... 710/260 |
| 2005/0060462 | A1* | 3/2005 | Ota ............................. 710/260 |
| 2005/0071531 | A1 | 3/2005 | Oshins |
| 2005/0125580 | A1 | 6/2005 | Madukkarumukumana et al. |
| 2006/0015668 | A1 | 1/2006 | Nguyen et al. |
| 2006/0112208 | A1* | 5/2006 | Accapadi et al. ........... 710/265 |

(Continued)

FOREIGN PATENT DOCUMENTS

KR 100145925 B1 5/1998

OTHER PUBLICATIONS

International Search Report dated Apr. 23, 2009 from corresponding International Application No. PCT/US2008/084622, filed Nov. 25, 2008.

(Continued)

*Primary Examiner*—Ryan M Stiglic
(74) *Attorney, Agent, or Firm*—Wolf, Greenfield & Sacks, P.C.

(57) ABSTRACT

An efficient interrupt system for a multi-processor computer. Devices interrupt a processor or group of processors using pre-defined message address and data payload communicated with a memory write transaction over a PCI, PCI-X, or PCI Express bus. The devices are configured with messages that each targets a processor. Upon receiving a command to perform an operation, the device may receive an indication of a preferred message to use to interrupt a processor upon completion of that operation. The efficiency with which each interrupt is handled and the overall efficiency of operation of the computer is increased by defining messages for the devices within the computer so that each device contains messages targeting processors distributed across groups of processors, with each group representing processors in close proximity. In selecting target processors for messages, processors are selected to spread processing across the processor groups and across processors within each group.

20 Claims, 4 Drawing Sheets

U.S. PATENT DOCUMENTS

2006/0259733 A1 11/2006 Yamazaki et al.
2006/0294277 A1 12/2006 Tetrick
2007/0005742 A1 1/2007 Eldar et al.
2007/0067521 A1 3/2007 Shen et al.
2009/0070510 A1* 3/2009 Crossland et al. ........... 710/266
2009/0070511 A1* 3/2009 Kaushik et al. ............. 710/267
2009/0089470 A1* 4/2009 Ven ........................... 710/260

OTHER PUBLICATIONS

*Interrupt Architecture Enhancements in Microsoft Windows Vista*, http://download.microsoft.com/download/5/7/7/577a5684-8a83-43ae-9272-ff260a9c20e2/MSI.doc.
*Kernel Enhancements for Windows Vista and Windows Server Longhorn*, http://download.microsoft.com/download/9/c/5/9c5b2167-8017-4bae-9fde-d599bac8184a/kernel-en.doc.

\* cited by examiner

US 7,783,811 B2

EFFICIENT INTERRUPT MESSAGE DEFINITION

BACKGROUND

Computer systems consist of one or more processors, each of which executes a collection of machine instructions. The processors may be physical components implemented in semiconductor chips or may be virtual, implemented by operations on one or more physical processors.

Some of the instructions executed by a processor may be performed entirely within the processor. Though, other instructions may entail interaction between the processor and other components of the computer system. Frequently, computer systems will contain separate devices with which the processors will interact as the computer operates. For example, memory operations may entail interactions with a hard disk and network communication operations may entail interaction with a network interface card.

To facilitate these interactions, a computer system may have a bus that supports communication between a processor and other devices. One common type of bus is known as the PCI (Peripheral Component Interconnect) bus. In addition to allowing data to be exchanged, some buses support messages that can signal an interrupt. A device may use such a message to signal to a processor that it has completed an operation requested by the processor or that it has otherwise performed some action or detected a condition that requires service from a processor. In this way, a processor can assign an operation to a device and perform other functions while the device is performing the operation.

Once the device finishes the operation, a processor is notified by the interrupt and may perform completion processing on the operation. The nature of completion processing may vary based on the device or operation performed. However, examples of completion processing include reading data from the device or delivering retrieved data to an application that requested the data.

Buses implemented according to the PCI, PCI-X, or PCI Express standard support the message signaled interrupt (MSI) and the message signaled interrupt extended (MSI-X) protocols. Devices that use these protocols may request service by writing a system specified data value to the system specified address using a PCI memory write transaction. System software initializes the message address and message data during device configuration. The message address encodes information on the target processors and delivery mode. The device performs a memory write for a pre-configured MSI message to interrupt the processor.

SUMMARY OF INVENTION

Interrupt servicing and overall computer system operation may be improved by appropriately defining and selecting messages for use by devices to interrupt processors in a multi-processor system. The messages may be defined using groups of processors based on proximity of the processors within each group. Groups may be distinct sets of processors or may overlap or may be contained within other groups. A desirable approach to interrupt servicing may be achieved by defining messages for each device such that the device has messages targeting processors distributed across the processor groups. If the most efficient processor is not a target of a message for a device, a message targeting a processor within the same group as the most efficient processor or a processor in a group in close proximity to the group containing the most efficient processor may be selected. By defining messages with processors distributed across proximity-based groups, the likelihood is increased that a device will have a message targeting the most efficient processor or a processor in close proximity to the most efficient processor.

Appropriate definition of messages may also improve overall efficiency of computer system operation. By defining messages that contain target processors distributed across the processors within each group, processing load is more efficiently distributed.

Accordingly, in one aspect, the invention relates to a method of operating a computer to define messages for the devices for use in issuing interrupts. The method may result in maximizing a number of groups within a plurality of proximity-based processor groups targeted by messages created for each device of the plurality of devices. The method may minimize a number of messages targeting each group.

In another aspect, the invention relates to a computer with a plurality of processors coupled to a plurality of devices over a bus. The computer may be programmed to define bus messages based on an ordering of processor groups and processors within the groups. Using this ordering, a desired distribution of messages across processors and processor groups may be achieved.

In a further aspect, the invention relates to a method of operating a computer to store messages in each of the devices for use in interrupting a targeted processor, send a request to a device to perform a function, and suggest which interrupt message the device should use upon completion of the function. The suggested message is selected by identifying an efficient processor to service the specific device interrupt and then selecting as the suggested message one which targets a processor based on its proximity to the efficient processor.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
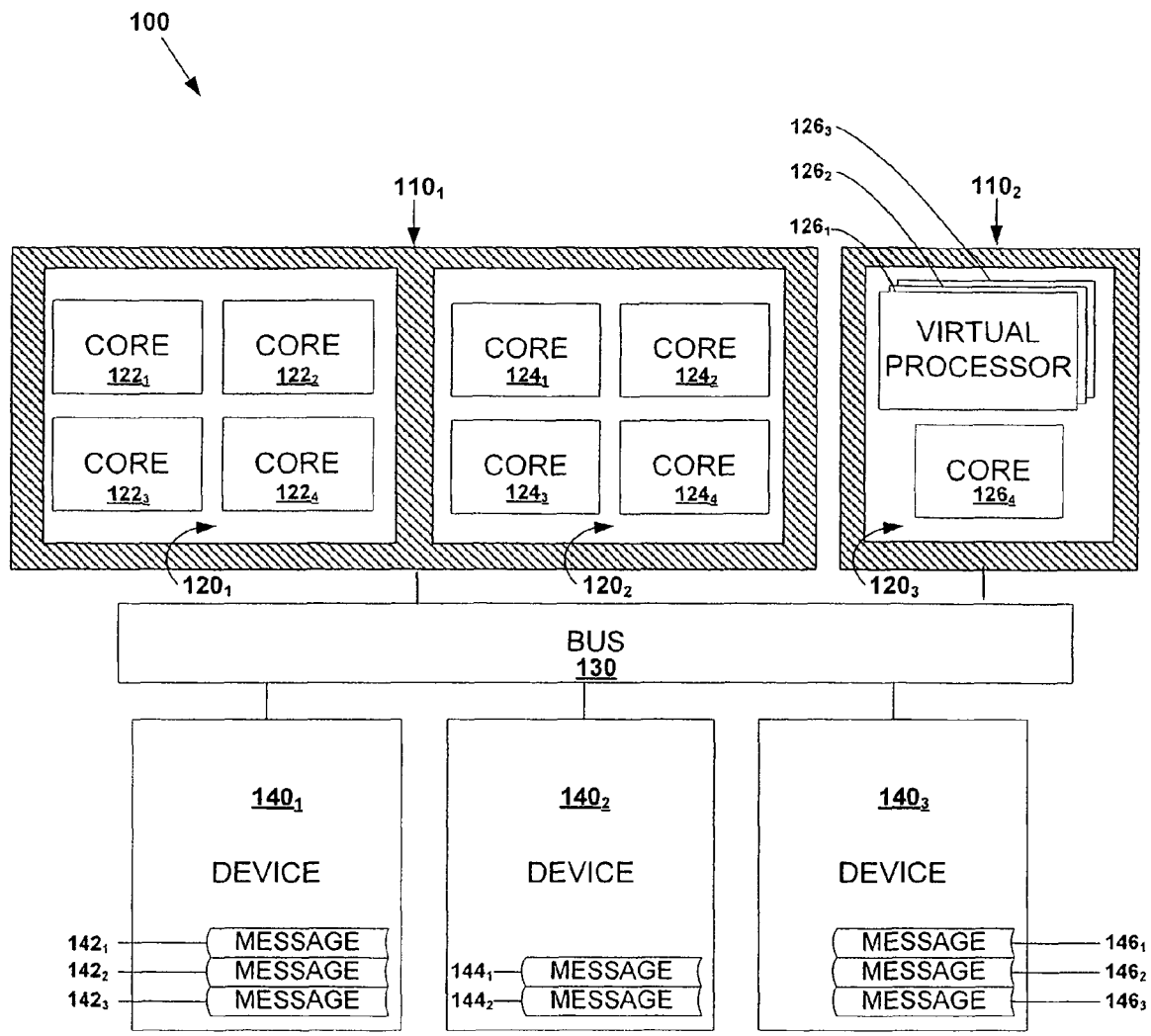
FIG. 1 is sketch illustrating a high-level overview of a prior-art multi-processor computer system.

The inventors have appreciated that for some interrupts in a multi-processor computer, such as those signaling completion of an input/output (I/O) operation assigned to a device, the efficiency of processing the interrupt may vary from processor to processor. Further, the efficiency with which each processor performs an operation may be proximity-based. Accordingly, in embodiments of the inventions, processors may be grouped based on proximity for the purpose of defining interrupt messages. A proximity-based grouping may consist of processors that have a close physical proximity to other processors in that grouping, and/or that have a proximity which facilitates efficient communication among the grouped processors.

For example, in completion processing performed following an I/O operation, a processor that initiated the I/O operation may be able to more efficiently access information or instructions necessary to complete the processing. Such a situation can arise because the processor initiating an operation may have information or instructions used in completing the I/O operation or subsequent related processing stored in a local cache or other memory locations to which that processor has preferential access. As a result, that processor may be capable of more efficiently performing processing that completes the operation or related processing than other processors.

For another processor to perform the same operation, there may be a loss of efficiency associated with processor-to-processor communication as the processor that initiated the I/O operation supplies information to the processor performing the completion processing. This loss of efficiency may be less for other processors within the same processor group as the processor initiating the interrupt because processor-to-processor communications for processors within proximity-based groups may be more efficient than processor-to-processor communications between processors in different groups. Moreover, the loss of efficiency may be based on proximity between the groups. As an example, processors implemented as cores physically in the same semiconductor chip may communicate using on-chip circuitry, which is likely faster than chip-to-chip communication circuitry. Accordingly, the cores on a single semiconductor chip may form a proximity-based group of processors. Likewise, processors in chips mounted on the same printed circuit board (PCB) likely can communicate more efficiently than processors on different PCBs that communicate across a bus.

Differences in efficiency based on proximity is not a phenomenon limited to physical processors. In a system with virtual processors, virtual processors hosted on the same physical processor may perform processor-to-processor interactions more efficiently than virtual processors hosted on different physical processors. Accordingly, the processors in a multi-processor computer system may form groups, and processors in some groups may perform certain operations more efficiently than others.

The inventors have appreciated that proximity-based groupings can be used to increase efficiency in computers signaling interrupts based on bus messages, such as occurs in computers operating according to the MSI-X protocol over a PCI bus. Each device in such a system that issues interrupts may have a limited number of messages available and therefore be limited in the number of processors that can be targeted by an interrupt. As a result, a device may not have a message available to target the most efficient processor to perform processing triggered by the interrupt. However, by appropriately defining messages for the devices, the likelihood can be increased that the device will have a message that targets a processor in close proximity to the most efficient processor.

With messages defined in this way, upon completion of an operation, a device may issue an interrupt to a processor using a message that targets an efficient processor. If the most efficient processor is not among the target processors of messages defined for the device, another processor may be selected as the target processor from the same group as the most efficient processor or in a group in close proximity to the group containing the most efficient processor. Thus, by appropriately defining messages for the device to use, the average processing per interrupt is reduced.

The inventors have appreciated that distributing messages evenly across processers within a proximity-based processor group can further contribute to an increase in computing efficiency by avoiding overloading any particular processor. For example, if multiple devices are connected to the computer, an unfavorable (inefficient) assignment of messages could result in messages simultaneously targeting the same processer. The invention reduces the likelihood that an unbalanced queue would accumulate at any one processor. Even if an imbalance is not so great as to cause a large queue, constant interrupts of a processor may preclude it from performing other functions. Accordingly, in some embodiments, definition of messages may also distribute the processing load evenly across all processors in each group and throughout the computer system. Though in other systems, efficiency may be increased by concentrating interrupts in one or a few processors and embodiments may be constructed that concentrate messages on one or a few processors.

FIG. 1 depicts a computer system 100 in which embodiments of the invention may be used. System 100 consists of multiple processors, both physical and virtual. In the example of FIG. 1, processors $122_1, \ldots, 122_4, 124_1, \ldots, 124_4$, and $126_1, \ldots, 126_4$ are shown. Each of the processors may be implemented on one or more semiconductor chips, with each semiconductor chip supporting one or more processors. System 100 is shown with semiconductor chips, $120_1, 120_2,$ and $120_3$. Twelve processors and three semiconductor chips are shown for simplicity, but the number of processors and semiconductor chips is not a limitation on the invention and any suitable number may be used.

Each of the semiconductor chips may be implemented as is known in the art. In the example of FIG. 1, semiconductor chips $120_1$ and $120_2$ are quad-core semiconductor chips, with each core being usable as a processor. Semiconductor chip $120_3$ is a single core chip. Such semiconductor chips are commercially available from sources such as Intel Corporation.

FIG. 1 illustrates that each processor need not correspond to separate physical circuitry. One or more of the processors may be virtual processors. In the example of FIG. 1, processors $126_1 \ldots 126_3$ are implemented as virtual processors. Virtual processors $126_1 \ldots 126_3$ may be implemented using known virtualization software executing within an operating system of computer 100. However, in embodiments of the invention, semiconductor chips and either physical or virtual processors may be implemented in any suitable way or may be obtained from any suitable source.

Chips $120_1$ and $120_2$ are mounted on printed circuit board (PCB) $110_1$, and chip $120_3$ is mounted on PCB $110_2$. Though two PCBs are shown, the number of PCBs is not a limitation of the invention and any suitable number may be used.

Components on different PCBs or on different parts of the computer system 100 may communicate over one or more buses. Processors may communicate over one bus, while I/O devices may communicate over another. In the example of FIG. 1, only a single bus is illustrated for simplicity. In such an embodiment, the processors on chip $120_1$ may communicate with the processors on chip $120_3$ using bus 130. Bus 130 may be a standardized bus as is known in the art. For example, bus 130 may be a PCI bus. However, the construction and protocol of bus 130 are not critical to the invention and any suitable bus or buses may be used in embodiments of the invention.

In operation, the processors may execute software such as application software or operating system software that performs functions based on the desired functionality of computer 100. Some functions may involve operations performed solely within the processors. Other functions may involve operations assigned to devices $140_1 \ldots 140_3$. Processors in FIG. 1 may communicate with devices $140_1$, $140_2$, $140_3$ over bus 130, including assigning operations to the devices $140_1 \ldots 140_3$.

Each device may process an operation assigned to it as a result of communication with one or more of the processors. In embodiments of the invention, the devices may perform I/O operations or any other suitable type of operation. Such devices may include hard disks, sound and video capture cards, network cards, or any other suitable device. Three devices are shown in system 100 for simplicity, but the number of devices is not a limitation on the invention and any suitable number may be used.

From time to time, a device may issue an interrupt to be serviced by a processor. Such interrupts may include a request for a processor to perform completion processing. In the embodiment illustrated, the devices use bus messages to signal interrupts to processors. Each device has a fixed number of messages available with which to transmit an interrupt to a targeted processor. For example, device $140_1$ has three messages $142_1$, $142_2$, $142_3$, which may target any three processors in the computer system 100. In embodiments of the invention, such messages may be formatted according to a suitable protocol for the bus over which they are transmitted. For example, PCI devices may utilize messages which operate according to the MSI-X protocol. Although FIG. 1 limits devices $140_1$, $140_2$, and $140_3$ to three, two, and three messages respectively, the number of messages available to a device is not a limitation of the invention and any appropriate number may be used.

In operation, each of the messages, $142_1 \ldots 142_3$, $144_1$, $144_2$, $146_1 \ldots 146_3$, may be defined by operating system software executing on one or more of the processors. However, in accordance with embodiments of the invention, the messages may be defined in any suitable way. In the example illustrated, each of the messages is addressed to target an interrupt handler in a physical or virtual processor within computer system 100. The message is also formatted to indicate to that interrupt handler that an interrupt represented by the message signals that a specific device has completed an assigned operation.

Figure 2:
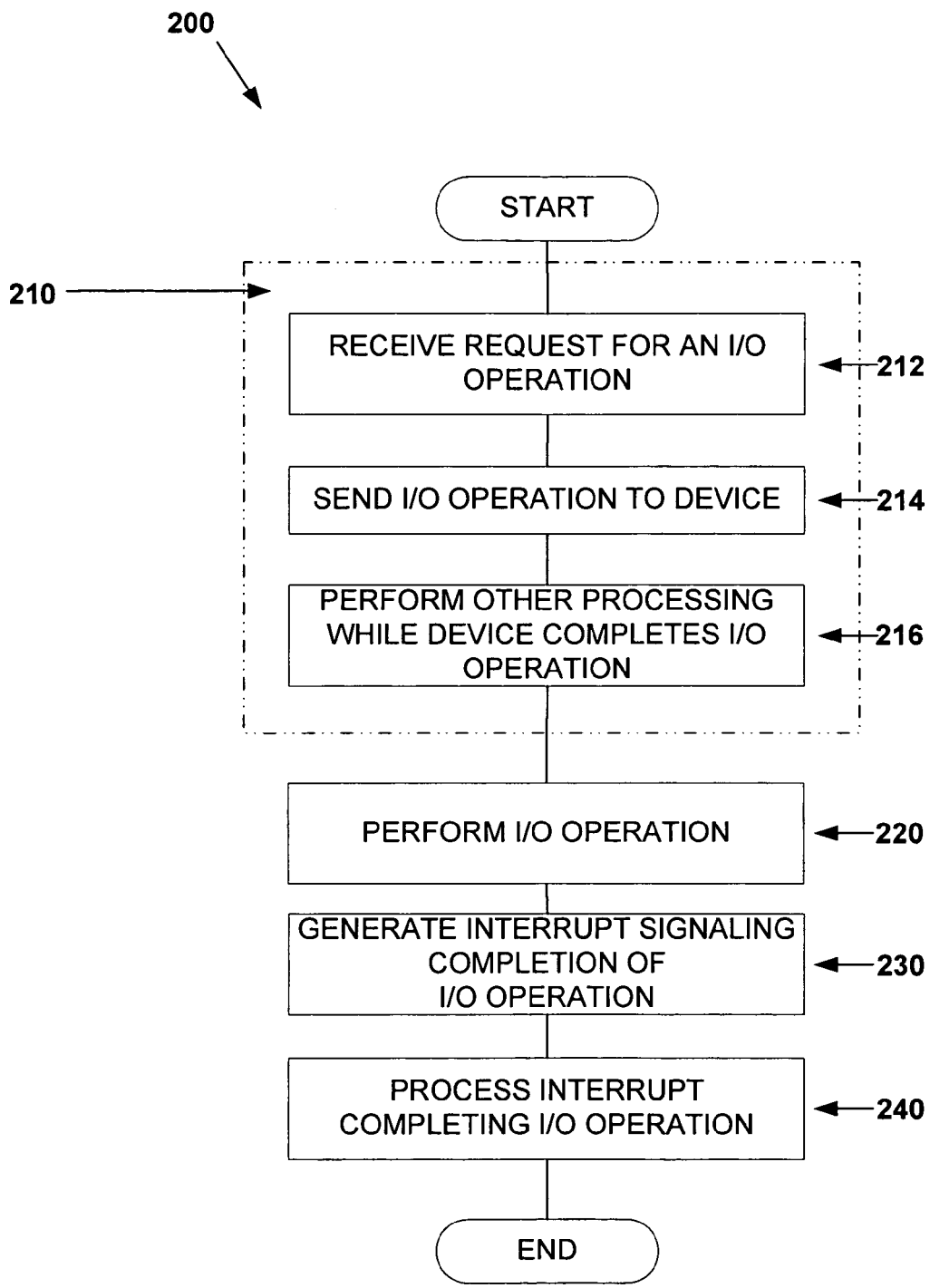
FIG. 2 is a block diagram showing the processing of an input/output (I/O) operation in a prior-art multi-processor computer system.

The defined messages may be used as part of a process of operating computer system 100 that includes assigning operations to devices $140_1 \ldots 140_3$. For example, FIG. 2 is a block diagram illustrating the initiation and completion of an input/output (I/O) operation in a prior-art multi-processor computer system 100. This I/O operation process 200 consists of subprocess 210, which comprises initial actions taken by a processor. Namely, in block 212, a processor receives a request for an I/O operation from an application program or other software being executed. In block 214, that processor assigns the I/O operation to a particular device and then, at block 216, returns to performing other tasks.

Meanwhile, the device performs the I/O operation assigned to it at block 220. In block 230, the device informs the computer that the I/O operation is complete by generating an interrupt using a message. The message sent may be selected from a set of predefined messages for the device, such as messages $142_1 \ldots 142_3$, $144_1$, $144_2$, $146_1 \ldots 146_3$. The receiving processor (not necessarily the same processor that initiated the operation in block 210) then processes the interrupt at block 240, thereby completing the I/O operation. Such completion processing may be as known in the art. However, in embodiments of the invention, any suitable completion processing may be performed.

The inventors have appreciated that the efficiency of assigning an operation to a device may be improved by proper definition of messages used to signal completion of an assigned operation. Some processors may more efficiently service some interrupts than other processors, and by defining messages to increase the likelihood that an efficient processor is a target of a predefined message, overall efficiency may be improved. One reason for variations from processor to processor in the efficiency of performing completion processing is that processors implemented in the same chip may communicate using on-chip circuitry, which is likely faster than chip-to-chip circuitry that may be used to communicate between processors on different chips on the same PCB. In contrast, processor-to-processor communication over a bus connecting the PCBs is likely slower than communication between processors on the same PCB or on the same chip. Because completion processing may require communication between processors, the efficiency with which processor-to-processor communication is performed may impact the overall efficiency with which completion processing is performed.

For example, the efficiency with which an I/O operation is performed may be improved if the initiating processor and the completion processor are either the same or at least in close physical proximity to one another such that processor-to-processor communication is efficient. The same processor that initiated an operation may have favorable access to information or instructions needed to complete the operation. As a result, that processor may perform the completion processing more efficiently than other processors. Alternatively, if the same initiating processor is not available for completion, a processor grouped in close physical proximity of the initiating processor may be a more efficient choice than a processor located outside of that grouping.

In embodiments of the invention, processors may be designated as being part of a particular proximity-based group so that all processors have a close physical proximity to other processors in their group, and/or have a proximity that facilitates efficient communication among the grouped processors. Groups may consist of distinct sets of processors or may overlap and thus result in multiple groups containing the same processor or processors. The defined processor groups may then be used in establishing messages for use by devices, such as devices $140_1 \ldots 140_3$, to use when signaling interrupts for completion processing of an assigned operation. Target processors in a set of messages for each device may be defined in a way that increases the likelihood that a processor that may efficiently perform completion processing is a target of a message defined for that device.

In a system as illustrated in FIG. 1, for example, an embodiment of the invention may designate that those processors lying on a single semiconductor chip $120_1$, $120_2$, or $120_3$ form a proximity-based processor group. Chips $120_1$ and $120_2$ lie on printed circuit board (PCB) $110_1$, and chip $120_3$ lies on PCB $110_2$. Because processors in chips mounted on the same PCB are likely to communicate more efficiently than processors on different PCBs that communicate through a bus, an embodiment of the invention may describe the processors on PCB $110_1$ as being in one group and those on PCB $110_2$ in a second group. Alternatively, cores within one semiconductor chip may be in closer proximity to each other than they are to cores in a separate semiconductor chip. In the example of FIG. 1, cores $122_1 \ldots 122_4$ may be regarded to form one group. Cores $124_1 \ldots 124_4$ within semiconductor chip $120_2$ may be regarded as a second group. Both physical and virtual processors within semiconductor chip $120_3$ may be regarded as a third proximity-based group. Furthermore, there is nothing preventing multiple proximity group definitions, such as those given above, from being used in a single implementation of this invention.

Figure 3:
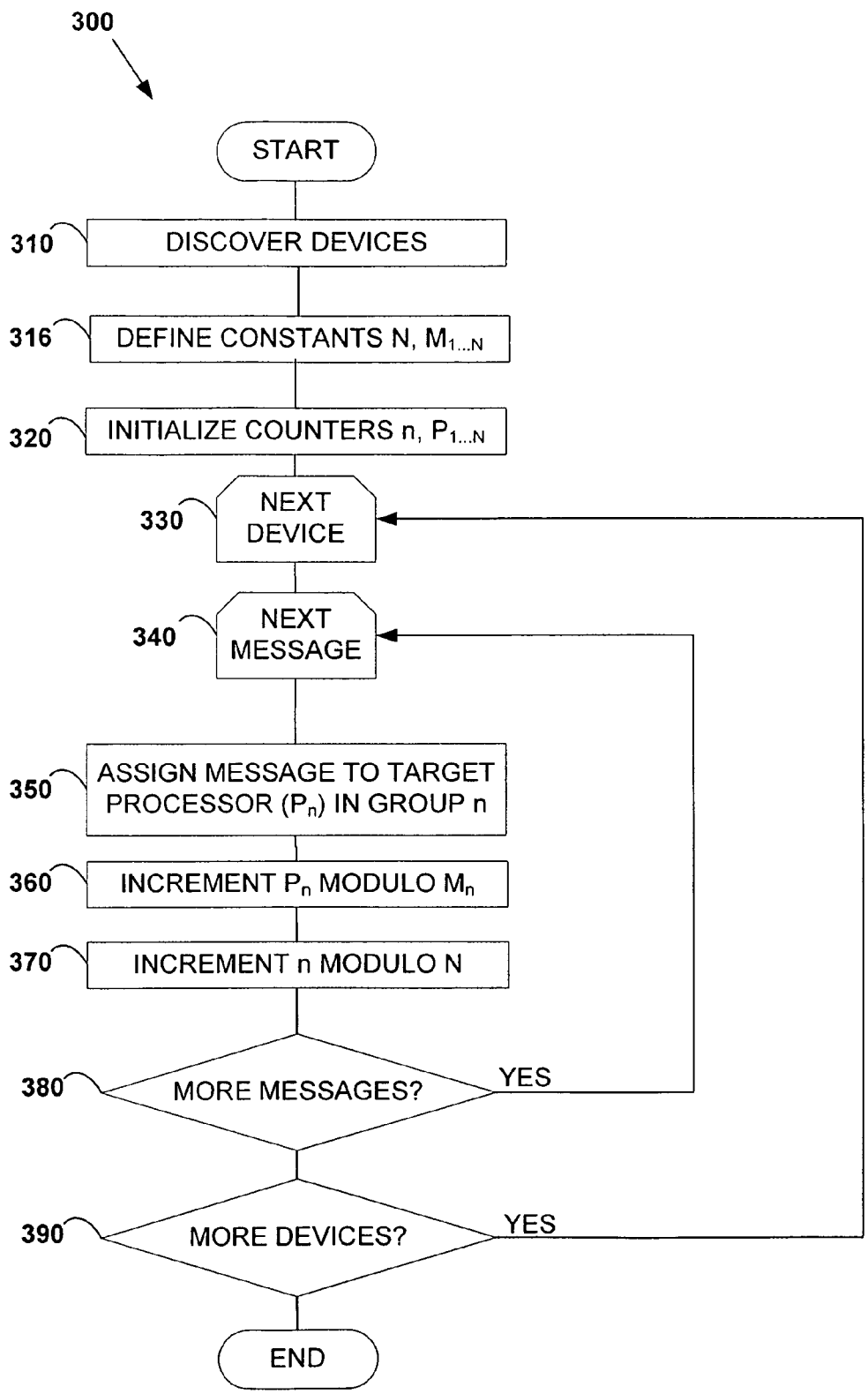
FIG. 3 is a flowchart of a process in which interrupt messages are defined and assigned to devices according to embodiments of the invention.

To facilitate efficiency improvements arising from the utilization of such proximity-based processor groupings, an example embodiment of the invention shown in FIG. 3 uses a process by which interrupt messages are defined and assigned to devices to increase the likelihood that a device will have available a message that can target an efficient processor. For example, in FIG. 1, device $140_1$ has three messages $142_1$, $142_2$, $142_3$ which may target any three processors in the computer system 100. In a prior-art system, these messages could potentially be targeted to a single processor or perhaps to processors on the same chip. Instead, the process illustrated in the embodiment in FIG. 3 would ensure an even distribution of these messages across proximity-based processor groups, with each message targeting a processor on a different chip.

As a specific example, each of the three message $142_1 \ldots 142_3$ that device $140_1$ is capable of storing may target a processor within a different one of the proximity-based groups created through the use of different semiconductor chips $120_1 \ldots 120_3$. As a specific example, message $142_1$ may target core $122_1$, message $142_2$ may target core $124_1$ and message $142_3$ may target virtual processor $126_1$.

Each of the three messages $146_1$, $146_2$, $146_3$ available for use by device $140_3$ may likewise target a processor in each of the three proximity-based groups that exist in computer system 100 (FIG. 1). The messages in device $140_3$ could target the same three processors that are targeted by the messages in device $140_1$. However, the inventors have appreciated that efficiency of operation of computer system 100 may also be improved if message targets are distributed across all of the processors, such that no processor is interrupted so frequently that other operations are not performed efficiently by that processor. Accordingly, in some embodiments, it may be desirable for the messages $146_1 \ldots 146_3$ created for device $140_3$ to target different processors than the messages $142_1 \ldots 142_3$ created for device $140_1$. For example, while message $142_1$ may target core $122_1$, message $146_1$ may target core $122_3$. Message $142_2$ may target core $124_1$, and message $146_2$ may target core $124_2$. Likewise, message $142_3$ may target virtual processor $126_1$, and message $146_3$ may target virtual processor $126_3$. This pattern of distributing messages across the processors may be used in assigning messages for all devices. For example, message $144_1$ for device $140_2$ may target core $122_2$ and message $144_2$ may target virtual processor $126_2$. In this way, the messages defined for any one of the devices may be distributed across the proximity-based groups, and the messages collectively defined for all of the devices may be distributed across the processors in system 100. In other embodiments, it may be more efficient for all devices targeting processors in a given proximity-based group to have their messages go to the same processor or a subset of the total set of processors in the group.

FIG. 3 illustrates a process by which such a distribution may be achieved in some embodiments of the invention. The process of FIG. 3 may be performed by the operating system of a computer or by any other suitable component. The process may be performed when the computer begins operation or when a device is detected during operation. Specifically, process 300 may start at block 310 with a computer system 100 discovering what devices are connected to it.

Processing at block 316 establishes the maximum number, N, of proximity-based processor groupings that are in the system and the maximum number $M_i$ of processors in group i, where i belongs to the set $\{1, 2 \ldots N\}$. Processor groups may be defined based on the architecture of the computer system 100 on which the process 300 is being executed. Any suitable definition of proximity may be used for defining groups. For example, in the embodiment of FIG. 1, processors were segregated into groups based on the specific semiconductor chip on which they were implemented. In other embodiments, the groups may be defined based on the specific PCB in which the processors are physically implemented. In other instances, a measure of time required for processor-to-processor communication may be used to define processors within the same proximity based groups. In other embodiments, combinations of these factors may be used to define groups, or groups may be nested to form a hierarchy. For example, a socket representing a physical chip may have multiple cores, each of which may in turn have multiple virtual processors. These processors could be grouped or nested at any level. While the embodiment of FIG. 3 only operates on a single level of groups, other embodiments may iterate through each level of the hierarchy to select a message target to assign. Regardless of how the groups are defined, processing at block 316 determines the number of groups and the number of processors within each group.

The process of FIG. 3 is shown to be an iterative process. The process iterates over each device for which messages are to be defined and iterates over each message to be defined for each device. In the embodiment illustrated, state information is maintained between iterations. In the example of FIG. 3, the state information is maintained in counters, but any suitable mechanism may be used to maintain state information. Accordingly, the beginning portion of process 300 involves initializing counters that maintain state information. In block 320, counter variables n and $P_{1 \ldots N}$ are initialized. Variable n denotes the current group being considered and can range in value from 0 to N−1. Variable $P_i$ denotes the current processor being considered in group i, where i belongs to the set $\{1, 2 \ldots N-1\}$ and $P_i$ ranges in value from 0 to $M_i-1$. Consequently, according to this embodiment, n and $P_i$ are all initialized to the value 0, indicating that the first group and first processor in that group will be considered first. The groups and processors within those groups can be ordered in any suitable way and is not a limitation on the invention.

In block 330, on the first time it is executed, a first device is considered, and in block 340, on the first time it is executed, a first message to be assigned to that device is considered. In block 350, on the first time it is executed, this first message is defined to target the first processor in the first group, as denoted by the current state of counter variables n and $P_i$.

In the interest of evenly distributing messages across groups and processors within groups, blocks 360 and 370 increment the counter variables such that the next group and first processor within that group are considered next. Incrementing the counters at blocks 360 and 370 is done using modular arithmetic. Modular arithmetic causes the counters to wrap around when their maximum values are reached. For example, at block 360, counter $P_n$ tracks the most recently assigned processor within group n. Counter $P_n$ should not equal or exceed the value, $M_n$, indicating the number of processors within group n. Accordingly, if the increment operation at block 360 would cause $P_n$ to equal the value $M_n$, the value of $P_n$ returns to zero. Likewise, processing at block 370 is performed as a modular increment. The value n incremented at block 370 represents the current group being processed. Because, in the embodiment illustrated, there are N groups, the value of n should not equal or exceed N. When the value of n is incremented to equal N, the value wraps around and n is set to zero.

If the first device has more messages that need to be assigned to it, the process branches from decision block 380 to block 340 where the next message is identified. That message is subsequently defined to target that second group and first processor within that group.

The process of assigning targets to messages for the first device will continue iteratively in this fashion. For each new message to be created for the first device, the process will move from group to group, returning to the first group when a processor from the last group has been assigned as a target of a message. Within each group, the target processor will be rotated and will return to the first processor in a group when the last one has been allocated.

This process may continue until sufficient messages for the first device have been defined. The process is then repeated from block 330 for each remaining device (block 390). Processing may loop back to block 330 at any suitable time. For example, process 300 may continue to loop back to block 330 until all of the devices detected upon start-up of a computer have been processed. If at some later time a new device is detected, process 300 may resume with processing at block 330. By resuming at block 330, the process may resume without re-initializing counters at block 320. In this way, the iterative process of distributing messages across processor groups may continue even for devices discovered after initial start-up. Such a capability, for example, may be employed with a computer configured with a "plug and play" architecture. A plug and play architecture may allow a computer to detect a newly added device. However, regardless of how devices are discovered, process 300 may be used to efficiently assign targets to messages used by each device.

As a specific example of the embodiment of FIG. 3, processors within each of the process 300 could be applied to the computer system 100 of FIG. 1. In doing so, chips $120_1$, $120_2$, $120_3$ could comprise the N=3 groups of interest. Messages $142_1$, $142_2$, and $142_3$ would be defined to target processors $122_1$, $124_1$, and $126_1$ respectively. Messages $144_1$ and $144_2$ would be defined to target processors $122_2$ and $124_2$ respectively. And, messages $146_1$, $146_2$, and $146_3$ would be defined to target processors $126_2$, $122_3$, and $124_3$, respectively. In this way, a balanced distribution of these messages across groups, and processors within these groups, has been achieved.

Figure 4:
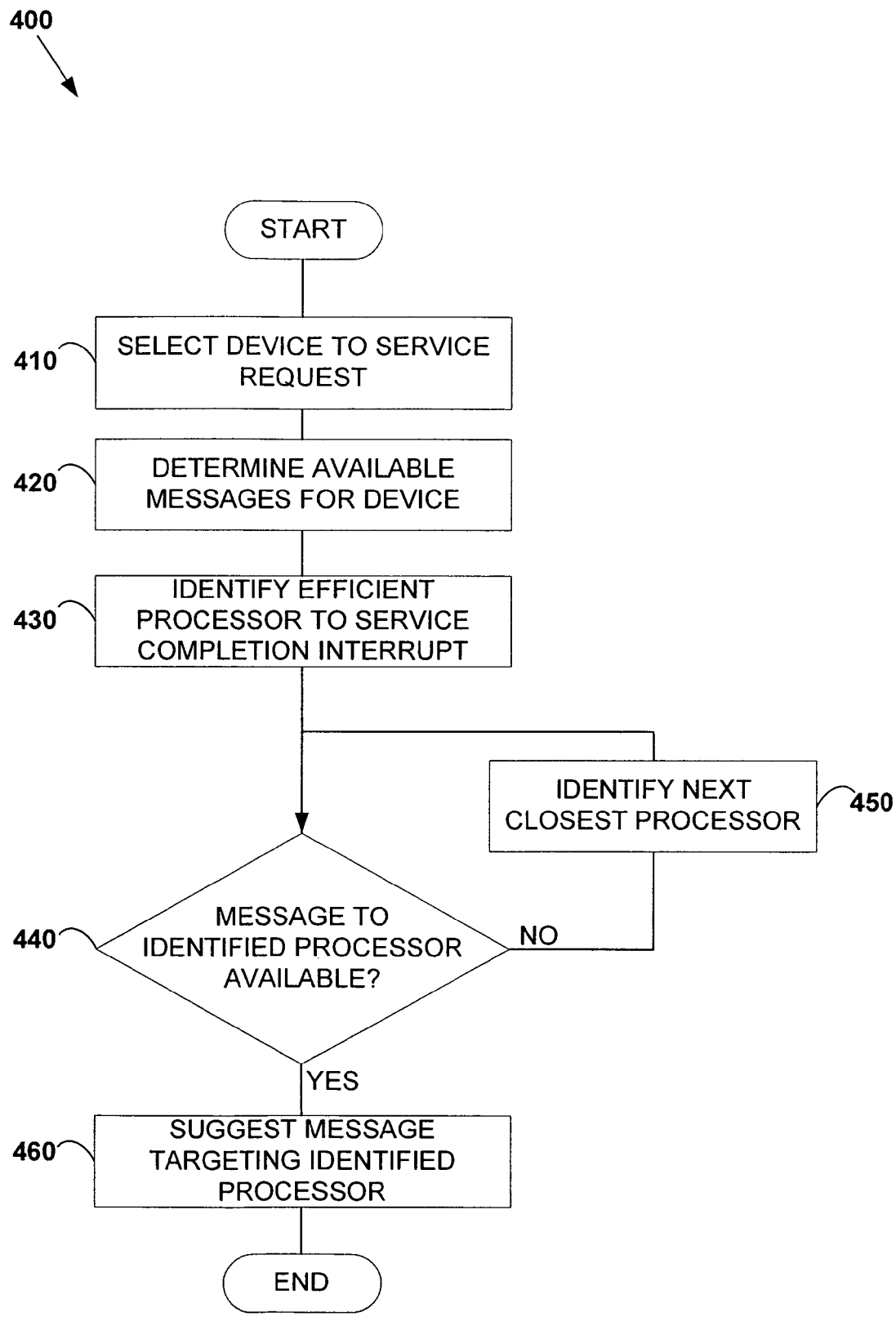
FIG. 4 is a flowchart of a process of assigning an operation to a device according to embodiments of the invention.

Once the messages have been defined, they may be used as part of ongoing processing within the computer. FIG. 4 illustrates one embodiment of a process by which the defined messages may be used. Namely, process 400 demonstrates that a processor may suggest a message to a device when assigning an operation to the device according to embodiments of the invention. In particular, in block 410, a processor selects a device to service a request. Such a request may be any suitable request (such as a request for an I/O operation) received from an application program or other software being executed.

However, regardless of how the request is initiated, a processor responding to the request may identify a device that performs an operation used in completing the request. As an example, a processor processing a request for information from a disk drive may identify that a disk drive needs to perform a read operation in order for the processor to complete the request. In that example, the device selected at block 410 may be the disk drive.

Regardless of how the device to service a request is identified at block 410, the process continues to block 420. The processor determines what interrupt messages are available to the selected device (block 420). The processor identifies an efficient processor to service the anticipated completion interrupt (block 430). Such an efficient processor may be identified in any suitable way and may depend on the nature of the operation to be performed by the device. For example, based on the nature of the request received at block 410, a processor may determine that it will utilize data made available as a result of completion processing for the request. In that scenario, the processor may select itself as the most efficient processor. In other scenarios, a processor may identify that, as a result of completion processing, data will be communicated to a different processor. In that scenario, the processor to receive the data may be identified as the most efficient processor to execute completion processing. However, the specific criteria used to identify the most efficient processor are not a limitation on the invention.

If the list of interrupt messages available to the device (as determined in block 420) includes one that targets the identified efficient processor, then the process branches from decision block 440 to block 460. At block 460, a suggestion is sent to the device to use the message targeting the identified process when sending its service completion interrupt upon completion of the requested operation. The suggestion for which message a device should use to signal that it has completed an assigned operation is not critical to the invention. The suggested message may be sent as part of assigning the operation to the device or in any other suitable way.

On the other hand, if the efficient processor is not targeted by any of the available messages identified in block 420, then the process branches from decision block 440 to block 450. The next closest processor may be identified at block 450. The next closest processor can be identified in any suitable way. In the embodiment illustrated, proximity-based groupings of processors which have a close physical proximity to other processors in that grouping, and/or which have a proximity which facilitates efficient communication among the grouped processors are used to identify relative closeness of processors.

Regardless of how the next closest processor is identified at block 450, the process loops back to decision block 440. At decision block 440, a check is again made as to whether the identified processor is a target of a message for the device to process the operation. If the identified processor is not a target of a message, the process again loops back to block 450 where a next closest processor is identified. The process may continue in this fashion until a processor is identified that is a target of a message available to the device to perform the operation. Once a message is found to have a matching targeted processor, that message is chosen as the one the processor will suggest be used by the selected device to send its service completion interrupt (block 460)

The inventors have appreciated that the process 400 is likely to improve the efficiency of assigning an operation to a device as compared to the prior art due to the initial defining and assigning of messages to devices (such as the embodiment illustrated in FIG. 3) which ensures a distribution of these messages that is balanced across proximity-based processor groups, and is further balanced across processors within groups.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer, the computer comprising a plurality of devices and a plurality of processors, the processors being configured in a plurality of groups based on proximity, the method establishing messages for each of the plurality of devices, each message for use in interrupting a processor of the plurality of processors, the method comprising:

creating a plurality of messages for each device of the plurality of devices, the creating comprising selecting a target processor for each of the plurality of messages so as to maximize, for each device of the plurality of devices, a number of groups within the plurality of groups targeted by messages created for the respective device, and to minimize a number of messages targeting each group of the plurality of groups.

2. The method of claim 1, further comprising:
storing, within each device of the plurality of devices, the plurality of messages created for the respective device.

3. The method of claim 1, wherein the creating further comprises:
selecting a target processor for each of the plurality of messages so as to minimize a number of messages targeting each processor of the plurality of processors.

4. The method of claim 1, wherein creating the plurality of messages comprises:
for each device of the plurality of devices, iteratively assigning a target processor to each of the plurality of messages for the respective device, the assigning comprising, for each successive iteration, assigning a target processor in a different group.

5. The method of claim 4, wherein:
the groups of processors are ordered; and
for each device, iteratively assigning a target processor to each of the plurality of messages comprises assigning in successive iterations target processors in successive groups in accordance with the order of the groups.

6. The method of claim 5, wherein:
the devices are ordered; and
for each device after a first device in the order, iteratively assigning a target processor to each of the plurality of messages comprises, for a first iteration, assigning a target processor in a group that follows in the order of groups a group of the processor assigned as a target processor in a most recent prior iteration for a device that precedes the respective device in the order of devices.

7. The method of claim 6, wherein:
the processors are ordered within each group; and
iteratively assigning a target processor to each of the plurality of messages comprises, for a first act of assigning a processor from a group, assigning a first processor in the order, and, for each act after the first of assigning a processor from the group, assigning a processor following a most recently assigned processor in the order of processors within the group.

8. The method of claim 1, further comprising discovering the plurality of devices and polling each discovered device to determine a number of messages the device can store.

9. The method of claim 1, wherein:
each group of the plurality of groups based on proximity consists essentially of processors that have a close physical proximity to other processors in the respective group, and/or that have a proximity that facilitates efficient communication among the processors in the respective group.

10. A computer system comprising:
a plurality of processors, the processors being configured in a plurality of groups based on proximity, the groups having an order and the processors within each group having an order;
a plurality of devices, each device adapted to issue interrupts, each interrupt to be serviced by a processor of the plurality of processors;
a bus interconnecting the plurality of devices and the plurality of processors; and
a computer storage medium storing computer-executable instructions that, when executed, perform a method establishing messages for each of the plurality of devices, each message formatted for transmission over the bus and each message for use in interrupting a processor of the plurality of processors, the messages established for each of the plurality of devices having an order, the method comprising:
assigning, for each device of the plurality of devices, target processors to messages, the assigning comprising, for each message, selecting a target processor from a group selected based on the group order, the processor selected from within the selected group being selected based on the order of processors within the selected group, such that target processors from groups adjacent in the group order are selected for messages adjacent in the message order for each device of the plurality of devices.

11. The computer system of claim 10, wherein the method performed by the computer-executable instructions further comprises:
as each target processor is assigned, updating a record of a position within the order of groups of processors and a position within the order of processors within the group.

12. The computer system of claim 10, wherein the assigning comprises:
assigning target processors to the messages of a first device before assigning target processors to the messages of a second device.

13. The computer system of claim 12, wherein the assigning comprises:
assigning one target processor from each of the plurality of groups before assigning a second target processor from any of the plurality of groups.

14. The computer system of claim 10, wherein at least one of the plurality of groups of processors comprises cores within a physical package.

15. The computer system of claim 10, wherein at least one of the plurality of groups of processors comprises a plurality of virtual processors executing on the same physical processor.

16. A method of operating a computer, the computer comprising a plurality of devices and a plurality of processors, the processors being configured in a plurality of groups based on proximity, the method establishing a plurality of messages for each of the plurality of devices to use in interrupting a processor of the plurality of processors, the method comprising:
storing, in each device of the plurality of devices, a plurality of messages, each message of the plurality of messages targeting a processor of the plurality of processors;
sending, from a processor of the plurality of processors to a device of the plurality of devices, a request to perform a function and a suggested message, of the plurality of messages stored in the device, for use in issuing an interrupt upon completion of the function, the act of sending comprising selecting the suggested message according to acts of:
identifying an efficient processor of the plurality of processors to efficiently service the interrupt issued from the device upon completion of the function; and
selecting as the suggested message a message targeting a processor of the plurality of processors based on proximity of the processor targeted in the suggested message to the efficient processor.

17. The method of claim 16, wherein selecting based on the proximity of the processor targeted in the selected message to the efficient processor comprises:
when a message targeting the processor sending the request is stored in the device, selecting as the selected message a message targeting the processor sending the request.

18. The method of claim 17, wherein selecting based on the proximity of the processor targeted in the selected message to the efficient processor further comprises:
when a message targeting the processor sending the request is not stored in the device and a message targeting a processor in the same group as the processor sending the request is stored in the device, selecting as the selected message a message targeting the processor in the same group as the processor sending the request.

19. The method of claim 18, wherein selecting based on the proximity of the processor targeted in the selected message to the efficient processor further comprises:
when a message targeting the processor sending the request is not stored in the device and a message targeting a processor in the same group as the processor sending the request is not stored in the device, selecting as the selected message a message targeting a processor in a group selected based on proximity to the group containing the processor sending the request.

20. The method of claim 18, wherein:
the processor sending the request is a virtual processor executing on a hardware core in the computer; and
selecting as the selected message a message targeting the processor in the same group as the processor sending the request comprises selecting a message targeting a virtual processor executing on the hardware core.

* * * * *